June 1, 1926.                                                    1,586,528
F. E. HODDERSEN-BALLING
HAM BOILER
Filed August 29, 1923
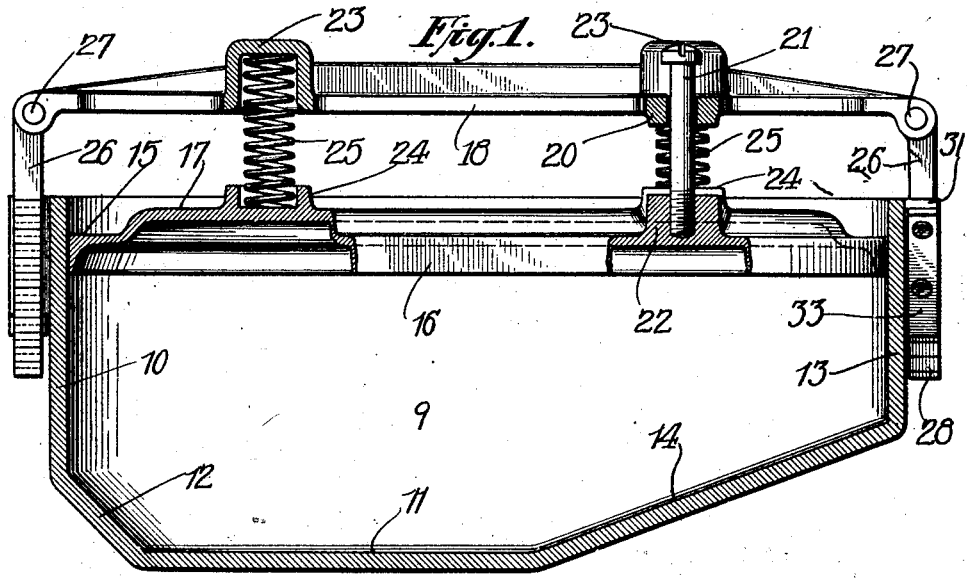
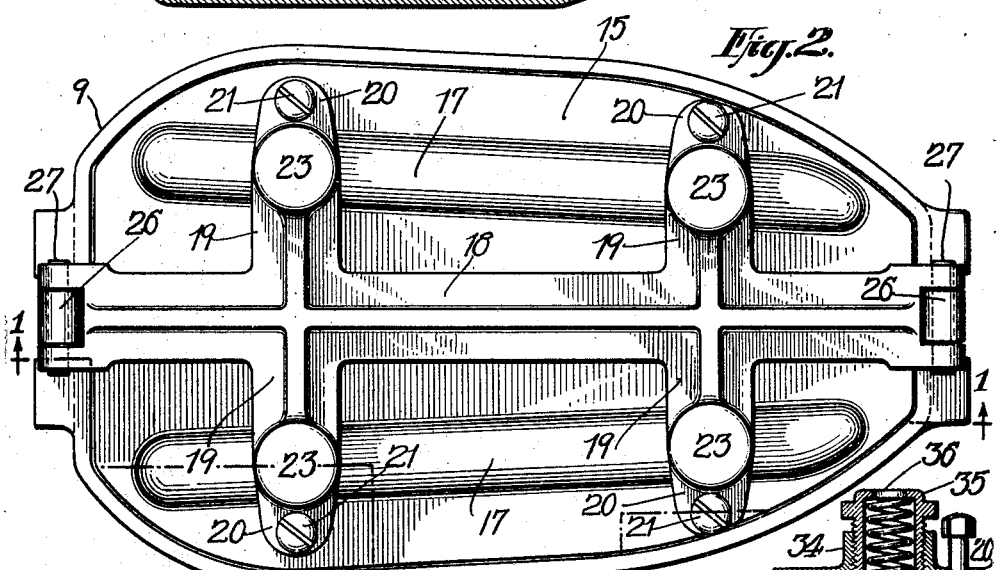
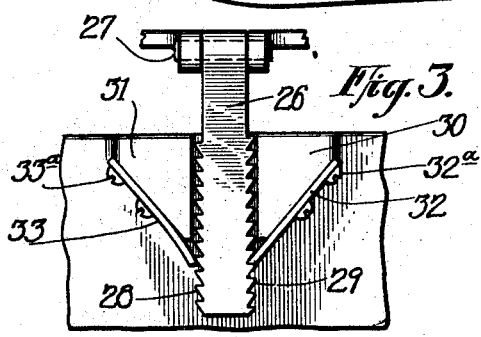
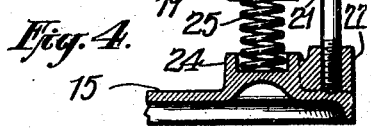
Inventor
F. E. Hoddersen-Balling
By his Attorneys:
Weeds Gray Patented June 1, 1926.

1,586,528

UNITED STATES PATENT OFFICE.

FREDERICK EDWARD HODDERSEN-BALLING, OF BROOKLYN, NEW YORK.

HAM BOILER.

Application filed August 29, 1923. Serial No. 659,862.

This invention relates to cookers adapted for the purpose of cooking various kinds of meat products, particularly ham, an object of the invention being to provide a cooker having improved means for supporting and operating the cover for the receptacle, as a result of which the meat or ham will be subjected to the proper pressure in order to shape the same and at the same time permitting it to expand properly during the cooking process.

A further object of this invention is to provide an improved cooker or ham boiler having a handle bar and a cover for the receptacle, and wherein an improved spring connection between the handle bar and cover is provided.

A further object of this invention is to provide a ham cooker having improved means for releasably connecting or locking the handle bar or other operating means for the cover to the receptacle.

Other objects of this invention will appear in the following description and appended claims thereof, reference being had to the accompanying drawings forming a part of this specification, wherein like reference characters indicate corresponding parts in the several views and wherein Fig. 1 is a sectional side elevation of a form of my invention taken substantially along lines 1—1 of Fig. 2; Fig. 2 is a plan view thereof; Fig. 3 is a fragmentary end view illustrating the means for locking the handle bar to the receptacle; and Fig. 4 is a fragmentary section illustrating a somewhat modified form of connection between the handle bar and cover.

Before explaining in detail the present improvement and mode of operation thereof, it is desired to have it understood that the invention is not limited to the details of construction which are illustrated in the accompanying drawings, since the invention is capable of other embodiments and that the phraseology which is employed is for the purpose of description and not of limitation.

Referring to the drawings it will be seen that the ham cooker or boiler in its present preferred form comprises a suitable receptacle 9 which is preferably shaped to conform substantially to the shape of the ham to be cooked. The receptacle 9 comprises the usual upright side walls and it will be noted that the end walls 10 and 13 are joined to the bottom wall 11 by means of inclined portions 12 and 14. The inclined portion 14 of the bottom wall permits the forward portion of the receptacle to conform more nearly to the shape of the knuckle end of the ham, and the angular portion 12 of the bottom wall is particularly adapted to shape the ham so as to avoid the accumulation of fat and waste material around the bottom corners of the receptacle as has heretofore been the case. I have found in practice that there is a tendency for water and fatty material to accumulate in the corners of the receptacle which form a jelly around the ham difficult to remove from the ham as well as from the cooker. The inclined portions 12 and 14 of the bottom wall of the receptacle obviate this disadvantage and therefore render the use of the cooker more efficient and satisfactory.

The receptacle 9 is provided with a suitable cover 15 which is provided with a downwardly extending marginal flange 16 adapted to fit into the receptacle. The cover 15 is formed with longitudinally extending hollow ribs 17 which strengthen the cover and resist the tendency thereof to bend or buckle when pressure is exerted thereupon by the operating handle. For the purpose of operating or manipulating the cover a suitable handle bar 18 is provided which comprises a member extending longitudinally from one end to the other of the receptacle, this member having laterally extending cross bars 19 preferably formed integrally therewith. Adjacent to the outer end of each laterally extending member 19 an upwardly extending spring receiving cup 23 is provided. Beneath each of the hollow cups 23 a spring receiving seat 24 in the form of a shallow cup is formed from one of the ribs 17. A coiled spring 25 is interposed between each pair of alined cups 23 and 24 and is seated therein. From this construction it will be seen that the handle bar has substantially a four-point spring connection with the cover 16, the springs being located at opposite sides of the central bar 18, so that in operation the pressure of the handle bar will be distributed to the cover at four different points. Moreover by virtue of the fact that the spring receiving cups or seats 23 extend above the bottom of the handle bar the seats 23 can be made deeper, thereby permitting the springs to have a greater portion of the length thereof seated in the cups or seats 23. This construction furthermore has the additional important advantage of enabling longer springs to be used, thereby insuring greater resiliency between the handle bar and cover, and without at the same time increasing the power required to compress the springs when forcing the cover down upon the ham.

Each of the laterally extending bars 19 is provided with an extended portion 20 which is bored to receive a guiding bolt 21, the latter being screwed into a lug 22 formed at the outer side of each spring receiving cup 24. The guiding bolts 21 act to guide the handle bar in a vertical plane relatively to the cover. It will thus be seen that side sway or lateral movement of the springs 25 is not only prevented by virtue of the increased depth of the seats 23, but also by virtue of the guiding bolts 21.

For the purpose of releasably locking the handle bar 18 to the receptacle a pair of swinging downwardly extending locking members 26 are pivoted at 27 to the opposite ends of the handle bar. The lateral edges of each locking members 26 are provided with upwardly extending teeth 28 and 29. It will be noted that the series of teeth 28 are located in alternation to the opposed series of teeth 29, or in other words each tooth of one series is located in a plane between a pair of teeth of the opposite series. For cooperation with the locking members 26 the receptacle at each end is provided with a pair of lugs or guides 30 and 31, each pair being spaced apart to form a vertical guideway therebetween for receiving one of the depending locking members 26. The under faces of the guides 30 and 31 are tapered or inclined in converging relation and to these faces are secured at 32ª and 33ª spring locking members or pawls 32 and 33. The forward working ends of the spring pawls 32 and 33 are in position to engage teeth 29 and 28 respectively.

In operation after the ham has been inserted in the receptacle and the cover 15 placed in position, the locking members 26 are arranged between the guide members 30 and 31 at opposite ends of the receptacle. Upon forcing down the handle bar, the cover 15 will be forced against the ham under tension due to the compression of springs 25. The resiliency of pawls 32 and 33 will permit the teeth of the locking members 26 to slide successively over the working ends thereof and due to the alternate position of the teeth 28 with respect to the teeth 29, either pawl 32 or 33 will cooperate with the member 26 to lock the handle bar in position upon obtaining the correct adjustment for the cover. By virtue of the alternate construction of the teeth 28 and 29 on the lateral edges of the members 26, the spring pawls may be made finer, and a finer adjustment obtained, thus securing a locking connection which will utilize more fully the resiliency of the springs.

Heretofore in ham cookers the ratchet teeth were located either on the receptacle or locking member between the inside juxtaposed faces thereof, and since these teeth were spaced apart a certain distance, the adjustment of the handle bar was limited to the extent of the space between the adjacent teeth, and in forcing the cover down upon the ham there was always a certain amount of adjustment lost due to the fact that it was not possible to engage the locking member at a point between a pair of adjacent teeth. This disadvantage is overcome by virtue of the present construction, since the alternate arrangement of the teeth 28 and 29 permit twice as fine an adjustment, thus decreasing by half the amount of play.

In Fig. 4 a somewhat modified construction is illustrated wherein means is provided for varying the tension of springs 25 located between the handle bar and the cover. In this embodiment each bar 19 extending laterally from the lengthwise extending bar 18 is provided with a tubular sleeve member 34, the inner face of which is threaded to cooperate with the exterior threads on a hollow spring receiving cup 35. This cup 35 extends a substantial distance above the handle bar and is adapted to receive the coiled spring 25. A hole 36 is formed at the top of each cup 35 and since the cup is hollow it can be readily cleaned by the insertion of a brush through the hole 36. Since the cup or spring receiving seat member 35 is threaded, it can be adjusted up or down so as to decrease or increase the tension of spring 25. It will be noted that the adjustable cup 35 is elongated so as to receive a considerable portion of the spring 25, thereby acting in conjunction with the guiding bolt 21 to prevent side play or relative movement of the spring during the operation of the handle bar.

From the foregoing construction it will also be noted that action of the locking devices in locking the handle bar to the receptacle, upon forcing the cover down upon the ham, is automatic. The guides 30 and 31 and the spring pawls 32 and 33 hold the locking members 26 in vertical locking position during the downward movement of members 26 between the guides, so that it is merely necessary to press down upon the handle bar to cause the locking devices to automatically operate without any manipulation thereof as heretofore. Furthermore the locking members can be easily released from the spring pawls merely by drawing the lower ends of the members outwardly, thus obviating the necessity, as heretofore, of first pressing down considerably on the handle bar in order to release the locking devices.

It is to be understood that by describing in detail herein any particular form, structure, or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. In a cooker the combination of a receptacle, a cover therefor, means for operating the cover, locking means for locking said operating means to the receptacle, a part of said locking means being carried by the receptacle and a part thereof by the operating means, said locking means including two series of alternating teeth.

2. In a cooker, the combination of a receptacle, a cover therefor, a handle bar for operating the cover and extending across the top thereof to overlie the end of the receptacle, a depending locking member pivoted to said end of the bar and provided with teeth, and a locking member having one end fixed to the receptacle and the opposite free end forming a spring engageable with said teeth.

3. In a cooker, the combination of a receptacle, a cover shiftable vertically within the receptacle, a handle bar extending across the top thereof to overlie the end of the receptacle, a vertical locking member pivoted to the end of the bar, a spring pawl secured to the receptacle, and a series of teeth carried by said locking member, said pawl automatically engaging said teeth successively upon depressing the handle bar and being releasable therefrom without shifting the handle bar.

4. In a cooker, the combination of a receptacle, a cover therefor, a handle bar for operating the cover and extending across the top thereof to overlie the end of the receptacle, a depending locking member pivoted to the end of said bar and provided with laterally extending teeth, and a spring locking pawl secured to the receptacle and engageable with said teeth, said locking member being releasable from the pawl by swinging the member outwardly without shifting said handle bar.

5. In a cooker the combination of a receptacle, a cover therefor, means for operating the cover and comprising a bar having a downwardly extending locking member pivoted thereto, said member having at the side edge thereof a series of laterally extending toothed portions, and resilient means carried by said receptacle for coacting with the toothed portions.

6. A cooker comprising a receptacle, a cover therefor, means for operating the cover and comprising a bar having a downwardly extending locking member pivoted thereto, said member having at opposite edges thereof laterally extending toothed portions, and a pair of spring locking members carried by said receptacle, each locking member inclined for engagement with said teeth.

7. A cooker comprising a receptacle, a cover therefor, a handle bar spring connected with and extending lengthwise of and spaced above the cover for manipulating the cover and having a downwardly extending locking member pivoted thereto, the side edge of said member having teeth projecting transversely of the receptacle, and a cooperating locking member secured to the end of the receptacle and extending transversely thereof for engagement with said teeth.

8. A cooker comprising a receptacle, a cover therefor, a handle bar for manipulating the cover and having a downwardly extending locking member pivoted thereto, a cooperating locking member carried by said receptacle, the lateral edge of one member having teeth extending transversely of the receptacle and the other member comprising a spring latch extending laterally with respect to the receptacle for engagement with said teeth.

9. In a cooker the combination of a receptacle, a cover therefor, a handle bar for manipulating the cover, means for locking the handle bar to the receptacle, a part thereof carried by said bar and a part by said receptacle, said means having two series of upwardly extending teeth, the teeth of one series being located in planes between the teeth of the other series.

10. In a cooker, the combination of a receptacle having a pair of guides, a cover for said receptacle, means for operating the cover, a locking member carried by said means and adapted to extend between said guides, said locking member having teeth extending laterally toward a guide, and a spring locking device connected to a guide and cooperating with said teeth, said locking device and member being releasable without shifting said cover.

11. In a cooker the combination of a receptacle having a pair of guides, a cover for said receptacle means for operating the cover, said means having a locking member adapted to extend between said guides, said guides and member having cooperating locking means and comprising two series of teeth, and a pair of resilient members coacting with said teeth.

12. In a cooker the combination of a receptacle having a pair of guides, a cover for said receptacle means for operating the cover, said means having a locking member adapted to extend between said guides, said guides and member having cooperating locking means and comprising two series of teeth, and a pair of downwardly inclined members coacting with said teeth.

13. A cooker comprising a receptacle, a cover therefor, operating means for manipulating the cover, spring means located between said operating means and cover, and adjustable seats for receiving said spring means and adapted to be adjusted for varying the tension of said spring means.

14. A cooker comprising a receptacle, a cover therefor, operating means for manipulating the cover, springs located between said operating means and cover, said operating means having hollow spring receiving seats extending above the bottom thereof, and a guiding bolt located entirely at one side of each spring and cooperating with said operating means for guiding the same in a vertical plane.

15. A cooker comprising a receptacle, a cover therefor, means for manipulating said cover and comprising a lengthwise extending bar having laterally extending cross bars, spring means located between said cross bars and cover and extending above the bottom of the bars, and guiding bolts extending through said cross bars at one side of said spring means for guiding the same in a vertical plane.

16. A cooker comprising a receptacle, a cover therefor, operating means for manipulating the cover, spring means located between said cover and operating means and extending above the bottom of the latter, means for releasably locking said operating means to the receptacle and including a locking member swingingly connected thereto and having two series of teeth, one series alternating with the other series, and a pair of locking members carried by said receptacle, and each thereof cooperating with a series of teeth.

17. A cooker comprising a receptacle, a cover therefor, means for operating the cover, a pair of locking devices at the end of the receptacle, and means adapted to be alternately engaged by said devices for releasably locking said operating means to the receptacle.

18. In a cooker the combination of a receptacle, a cover therefor and means for holding the cover in position and comprising a bar having a member pivotally secured thereto and provided with two sets of teeth alternately located relatively to each other and means for alternately engaging said teeth.

19. In a cooker the combination of a receptacle, a removable cover therefor and means for holding the cover in position and comprising a bar and having at each end a hinged member provided with two sets of teeth along its opposite sides alternately located relatively to each other and a pair of similarly formed means for alternately engaging said teeth.

Signed at Brooklyn, N. Y., this 20 day of August 1923.

FREDERICK EDWARD HODDERSEN-BALLING.